(12) United States Patent
Ohgose et al.

(10) Patent No.: US 8,422,861 B2
(45) Date of Patent: Apr. 16, 2013

(54) CONTENT MANAGEMENT DEVICE

(75) Inventors: Hideyuki Ohgose, Shijyounawate (JP); Katsuo Saigo, Kobe (JP); Hiroaki Shimazaki, Katano (JP); Kenjiro Tsuda, Hirakata (JP)

(73) Assignee: Panasonic Corporation, Osaka (JP)

( * ) Notice: Subject to any disclaimer, the term of this patent is extended or adjusted under 35 U.S.C. 154(b) by 1051 days.

(21) Appl. No.: 11/244,031

(22) Filed: Oct. 6, 2005

(65) Prior Publication Data

US 2006/0114785 A1 Jun. 1, 2006

(30) Foreign Application Priority Data

Nov. 30, 2004 (JP) ................................. 2004-347542

(51) Int. Cl.
*H04N 9/80* (2006.01)

(52) U.S. Cl.
USPC ............................................................ 386/248

(58) Field of Classification Search ............... 386/46, 386/95, 124, 125–126, 239, 241, 247, 248, 386/252, 254, 257, 259
See application file for complete search history.

(56) References Cited

U.S. PATENT DOCUMENTS

| | | | | |
|---|---|---|---|---|
| 5,909,421 | A * | 6/1999 | Yatomi | 369/84 |
| 6,594,740 | B1 * | 7/2003 | Fukuda | 711/156 |
| 6,636,953 | B2 * | 10/2003 | Yuasa et al. | 711/161 |
| 7,177,873 | B2 | 2/2007 | Komatsu | |
| 7,330,637 | B2 * | 2/2008 | Kobayashi | 386/46 |
| 8,095,469 | B2 | 1/2012 | Yamashima et al. | |
| 2001/0040862 | A1 * | 11/2001 | Ando et al. | 369/275.3 |
| 2002/0143807 | A1 | 10/2002 | Komatsu | |
| 2002/0146238 | A1 * | 10/2002 | Sugahara | 386/94 |
| 2003/0077074 | A1 * | 4/2003 | Okamoto et al. | 386/94 |
| 2004/0252771 | A1 * | 12/2004 | Oishi | 375/240.26 |
| 2007/0124250 | A1 | 5/2007 | Yamashima et al. | |

FOREIGN PATENT DOCUMENTS

| | | |
|---|---|---|
| JP | 11-259964 | 9/1999 |
| JP | 2001-332021 | 11/2001 |
| JP | 2002-074830 | 3/2002 |
| JP | 2002-278859 | 9/2002 |
| JP | 2002-358241 A | 12/2002 |
| JP | 2002-358242 A | 12/2002 |
| JP | 2003-044361 | 2/2003 |
| JP | 2004-054988 | 2/2004 |
| JP | 2010-231789 | 10/2010 |
| WO | WO 2006/022006 | 3/2006 |

OTHER PUBLICATIONS

Japanese Office Action issued in Japanese Patent Application No. 2004-347542, mailed Apr. 13, 2010.
Japanese Office Action issued in Japanese Patent Application No. 2010-186418 dated Mar. 6, 2012.

* cited by examiner

*Primary Examiner* — Tat Chio
(74) *Attorney, Agent, or Firm* — McDermott Will & Emery LLP

(57) ABSTRACT

The present invention provides a content management device manages not to reproduce a part of contents in output source/destination concurrently, and manages to reproduce the whole contents in the original sequence continuously.
A content management device is a device for managing reproduction of content from the first medium for which data corresponding to a part of the content output to the second medium. This device includes an outputting circuitry configured to output data corresponding to the part of the content, and a reproduction controller configured to disable reproduction of the part of the content recorded in the first medium when the outputting circuitry outputs the data corresponding to the part.

7 Claims, 11 Drawing Sheets

FIG. 5

| Medium | Content storage unit 13 | Portable recording medium 2 |
|---|---|---|
| Medium identifier | α | β |
| Content identifier (Location of content) | B0<br>C1(Pi0, Po0)<br>B2<br>C3(Pi1, Po1) | D1<br><br>D3 |
| File management information | FA | |

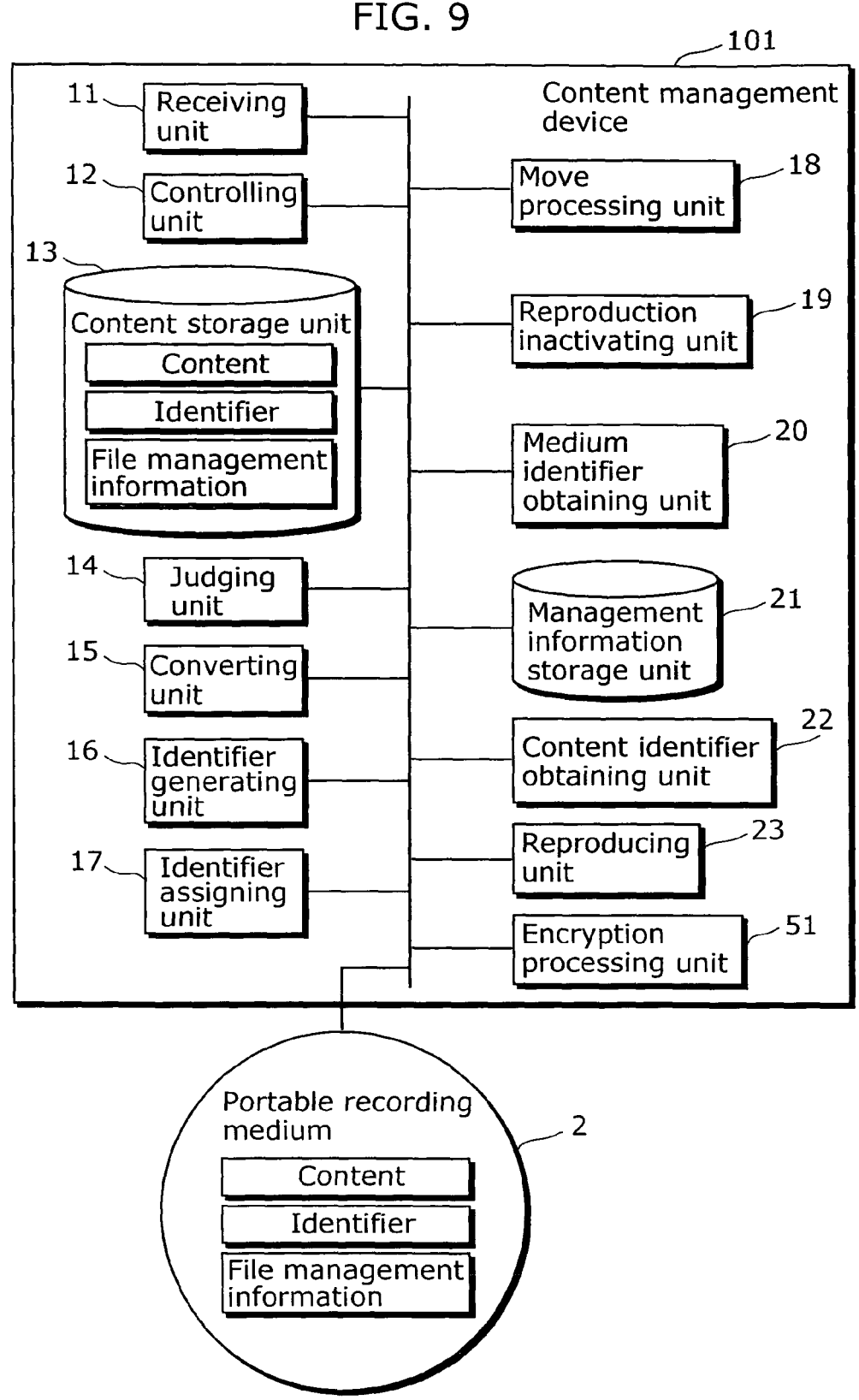

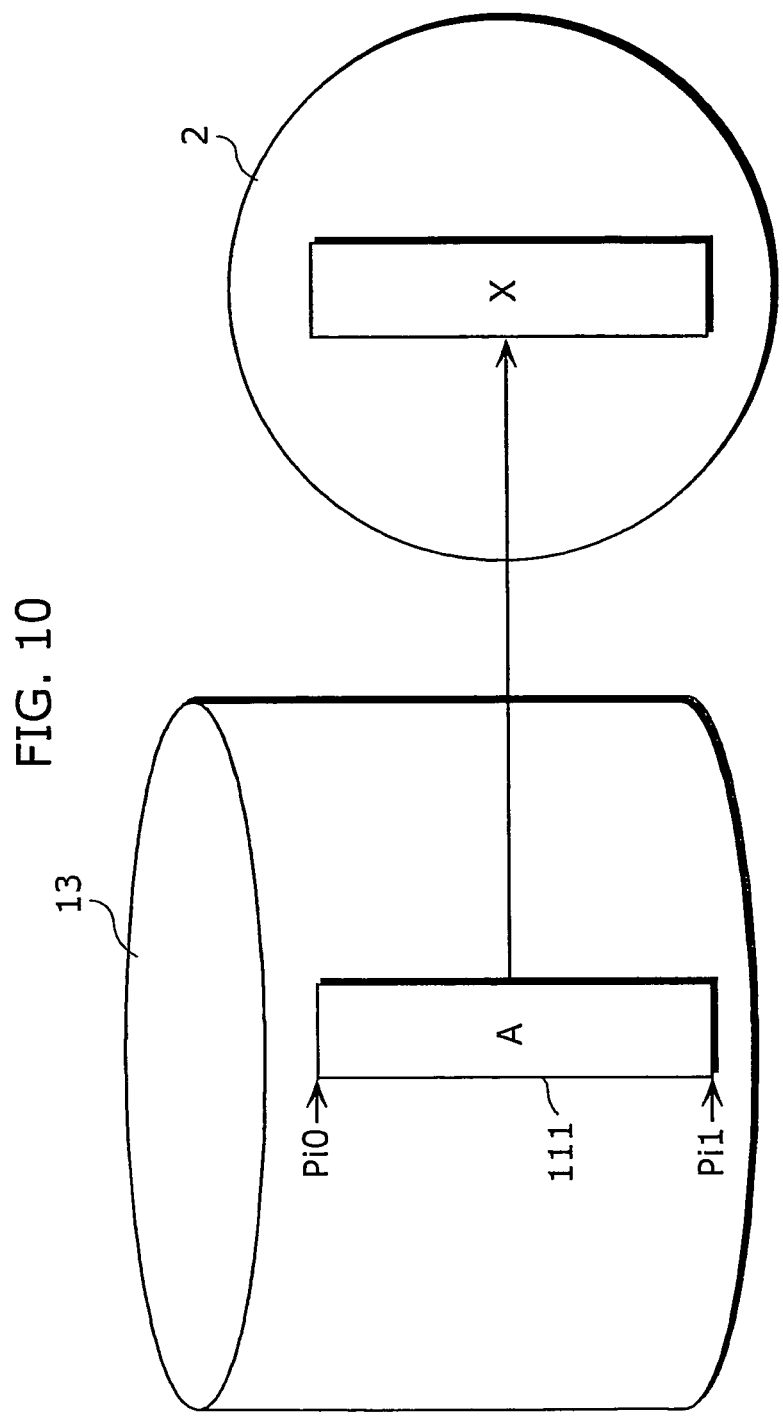

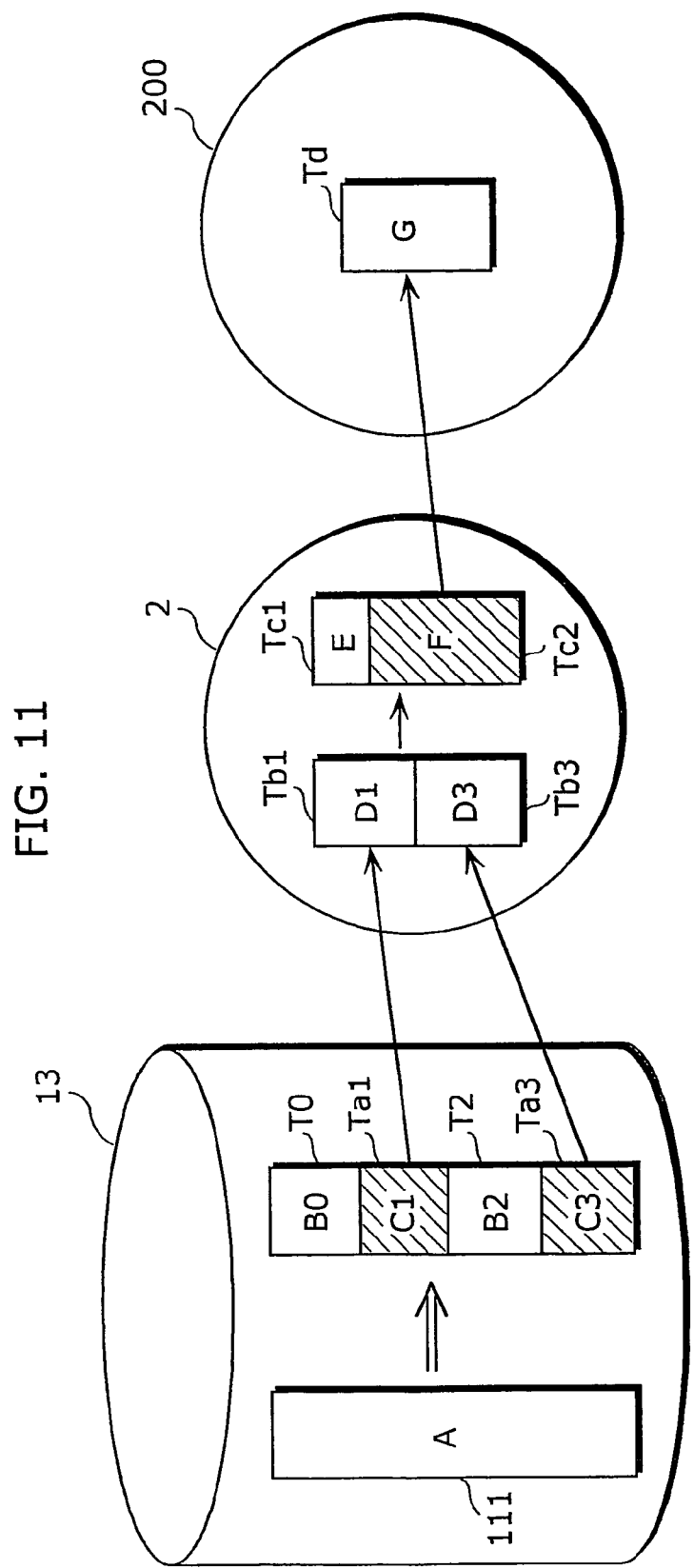

CONTENT MANAGEMENT DEVICE

BACKGROUND OF THE INVENTION (1) Field of the Invention

The present invention relates to a content management device to manage reproduction of a content after the content being moved.

(2) Description of the Related Art

In recent years, a Digital Video Recorder is popular for recording a received broadcasting signal for Standard-definition Television (SDTV, analog broadcasting) into Hard Disk Drive (HDD) and optical disks such as Digital Versatile Disc Random Access Memory (DVD-RAM) by digitalizing and further encoding and compressing. Furthermore a digital video recorder, which is able to record satellite/terrestrial broadcasting signals for High-definition Television (HDTV), has been introduced into the market.

The digital broadcasting signal is characterized in that the qualities of video/audio are not deteriorated even after repeated duplications, unlike the analog broadcasting signal. It is, therefore, very significant to establish a rule to prevent from copying illegally so as to protect the copyright of content. Regarding the digital broadcasting signal, a copy control information is multiplexed in the digital video/audio contents, and thus a rule called copy-once, that allows to record a broadcasting signal only once when the broadcasting signal is received, has been introduced. Hence the copyright of content is protected.

Once the digital video/audio content with copy-once is recorded into a recording medium such as HDD and DVD-RAM, the copy control information is shifted to non-duplicable control information at that time, and the duplication of the content is prohibited. Yet it is allowed to move the content from a recording medium which has the content (a first recording medium) to another recording medium (a second recording medium).

One example of a technique related to duplication is disclosed in Japanese Laid-Open Patent application No. 2002-358241, "Copy management method of content, recording/reproducing device and reproducing device". According to the technique in this example, the same number of virtual contents as the number of rights for duplicable times is available for a user, and the virtual content is moved at the time of duplication, while the virtual content in the source is deleted. Moreover it is disclosed that the number of rights for duplicable times are increased in the destination and are decreased in the source by the number of performed moving for duplication so as to protect from illegal duplication.

SUMMARY OF THE INVENTION

It is allowed to move a content from the first recording medium to the second recording medium, however the content recorded in the first recording medium is processed to prevent from reproducing. This process means to inactivate the reproduction. Consequently, for example, when the content in deteriorated quality is moved from the first recording medium to the second recording medium (e.g. memory card) so as to reproduce the content by a portable terminal device, only the content in deteriorated quality is available for reproduction. A technique can, therefore, be conceivable to be provided to manage the pre-moving content and the moved content to limit the reproduction of both contents concurrently so as to protect the copyright of the content, as well as to reproduce the content in high quality like the pre-moving content.

On the other hand, moving a part of the content may be required by user so as to, for example, make the content size to be stored into the second recording medium small. For example, when a content from TV program is moved, the user wants to move the content excluding the part of commercial messages. However conventionally, there is no method to manage both the part of the pre-moving content and the part of the moved content so as to reproduce the pre-moving content and, at the same time, not to reproduce the part of the pre-moving content and the part of the moved content concurrently. Thus the method to meet this demand is requested. And also when the part of the content is moved, it has not been possible to reproduce both the part of the moved content and the part of the content not to be moved in the original sequence continuously with conventional method. The method to make the above-mentioned function available is, therefore, requested.

In view of aforementioned problems, an object of the present invention is to provide a content management device for 1) outputting a part of a content, for 2) not reproducing the part of the content in the source and in the destination concurrently, and for 3) reproducing the whole content in the original sequence continuously.

In order to achieve the object, the content management device in the present invention is a device for managing reproduction of content from the first medium for which data corresponding to a part of the content output to the second medium. This device includes an outputting circuitry configured to output data corresponding to the part of the content, and a reproduction controller configured to disable reproduction of the part of the content recorded in the first medium when the outputting circuitry outputs the data corresponding to the part.

The content management device may further include an identifier assigning circuitry configured to assign the first identifier to the part of the content recorded in the first medium, and to assign the second identifier to the data corresponding to the part of the content output.

The content management device may further include a medium identifier circuitry configured to obtain identifiers of the first medium and the second medium.

The content management device may further include a memory for storing an identifier of the first medium, an identifier of the second medium, the first identifier corresponding to the part of the content recorded in the first medium, and the second identifier corresponding to the data corresponding to the part of the content output.

The content management device may further include a controller configured to control recording the first identifier in the first medium and recording the second identifier in the second medium.

The content management device may further include a reproducing circuitry configured to reproduce the content after the outputting circuitry outputs data corresponding to the part of the content.

The identifier assigning circuitry may be further configured to assign a remainder identifier to a part of the content that was not output.

The controller may be further configured to control recording a remainder identifier corresponding to a part of the content that was not output into the first medium, in the case where the outputting circuitry outputs the part of the content.

The reproducing circuitry may be configured to reproduce the content after the outputting circuitry outputs the part of the content in the case where a remainder identifier corresponding to a part of the content that was not output is stored.

The reproducing circuitry may be further configured to reproduce the content by utilizing one of or both of a head position and an end position for the part of the content recorded in the first medium, in the case where the outputting circuitry outputs the part of the content.

The reproducing circuitry may be further configured to reproduce the content by reproducing a part of the content that was not output and the part of the content of which reproduction inactivated by the reproduction controller.

The reproducing circuitry may be further configured to reproduce the content by reproducing a part of the content that was not output and the part of the content output.

The content management device may further include medium identification circuitry configured to determine whether or not the second medium is a medium in which data can be recorded and the outputting circuitry may be configured to output the part to the second medium, in the case where the second medium is determined to be capable of recording data.

The content management device may further include encryption circuitry configured to encrypt data representing the data corresponding to the part output, and decryption circuitry to decrypt data encrypted by the encryption circuitry.

The content management device may further include conversion circuitry configured to convert the quality of the part of the content to be outputted by the output circuitry, and the output circuitry may be configured to output the part of the content converted by the conversion circuitry to the second medium.

The conversion circuitry may be, based on an instruction from outside, configured to activate the part of the content of which reproduction is disabled by the reproduction controller, and to convert the quality of the part of the content.

The conversion circuitry may be further configured to convert, in the case where the content is a video signal, a part of or all of compression modes, bit rates, image sizes and frame rates for the video signal, and to convert, in the case where the content is an audio signal, a part of or all of compression modes, bit rates, number of samplings and number of channels for the audio signal.

A content management method in the present invention is a method for managing reproduction of content from the first medium for which data corresponding to a part of the content is to be copied to the second medium, for outputting data corresponding to the part of the content recorded in the first medium and for disabling reproduction of the part of the content recorded in the first medium, in the case where data corresponding to the part of the content has been output.

The content management method may further include the steps of assigning a first identifier to the part of the content recorded in the first medium, and assigning a second identifier to the data corresponding to the part of the content output.

The content management method may further include the step of obtaining identifiers of the first medium and the second medium.

The content management method may further include the step of storing the identifier of the first medium, the identifier of the second medium, the first identifier corresponding to the part of the content recorded in the first medium, and the second identifier corresponding to the data corresponding to the part of the content output.

The content management method may further include the step of controlling recording of the first identifier in the first medium and recording the second identifier in the second medium.

The content management method may further include the step of reproducing the content after outputting the data corresponding to the part of the content.

The content management method may further include the step of assigning a remainder identifier to a part of the content that was not output.

The content management method may further include the step of controlling recording of a remainder identifier corresponding to a part of the content that was not output into the first medium, in the case where data corresponding to the part is output.

The content management method may further include the step of reproducing the content after outputting the part of the content in the case where a remainder identifier corresponding to a part of the content that was not output.

The content management method may further include the step of reproducing the content by utilizing one of or both of a head position and an end position for the part of the content recorded in the first medium, in the case where outputs the part of the content is output.

The content management method may further include the step of reproducing a part of the content that was not output and the part of the content for which reproduction was disabled.

The content management method may further include the step of reproducing a part of the content that was not output and the part of the content for which corresponding data was output.

The content management method may further include the steps of determining whether or not the second medium is a medium in which data can be recorded, and outputting the part to the second medium, in the case where the second medium is determined to be capable of recording data.

The content management method may further include the step of encrypting data representing the data corresponding to the part output.

The content management method may further include the step of converting the quality of the part of the content to be outputted.

A program for managing reproduction of content from the first medium for which data corresponding to a part of the content is to be copied to the second medium, the program causing a computer to execute outputting data corresponding to the part of the content recorded in the first medium and disabling reproduction of the part of the content recorded in the first medium, in the case where data corresponding to the part of the content has been output. The program is stored in CD-ROM and the program can be utilized through the transmission media such as communication network.

The present invention is able to provide the content management device for 1) outputting a part of a content, for 2) not reproducing the part of the content in the source and in the destination concurrently, and for 3) reproducing the whole content in the original sequence continuously.

According to the present invention, the part of the content in the source and in the destination are not reproduced concurrently even in the case when the data rate and the resolution for the part of the digital video/audio content are deteriorated by re-encoding and compressing, and subsequently the part of the content is outputted to the external recording medium, and it is possible to reproduce the whole of the content in the original quality. Besides it is possible to restore the original content repeatedly, the reproduction can, therefore, be reattempted even after failure of re-encoding and compressing.

Further Information About Technical Background to this Application

The disclosure of Japanese Patent Application No. 2004-347542 filed on Nov. 30, 2004 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 5 is a diagram of content information in the first embodiment.

FIG. 9 is a block diagram illustrating a configuration of a content management device 101 and the portable recording medium 2 in the third embodiment.

FIG. 10 is a diagram to describe moving the whole content.

FIG. 11 is a diagram to describe moving a part of a content again and the effect of the content management device.

DESCRIPTION OF THE PREFERRED EMBODIMENTS

The preferred embodiments for the present invention will be described hereinafter using the drawings.

The First Embodiment

A configuration of a content management device 1 in the first embodiment will be described using FIG. 1 and FIG. 2.

Figure 1:
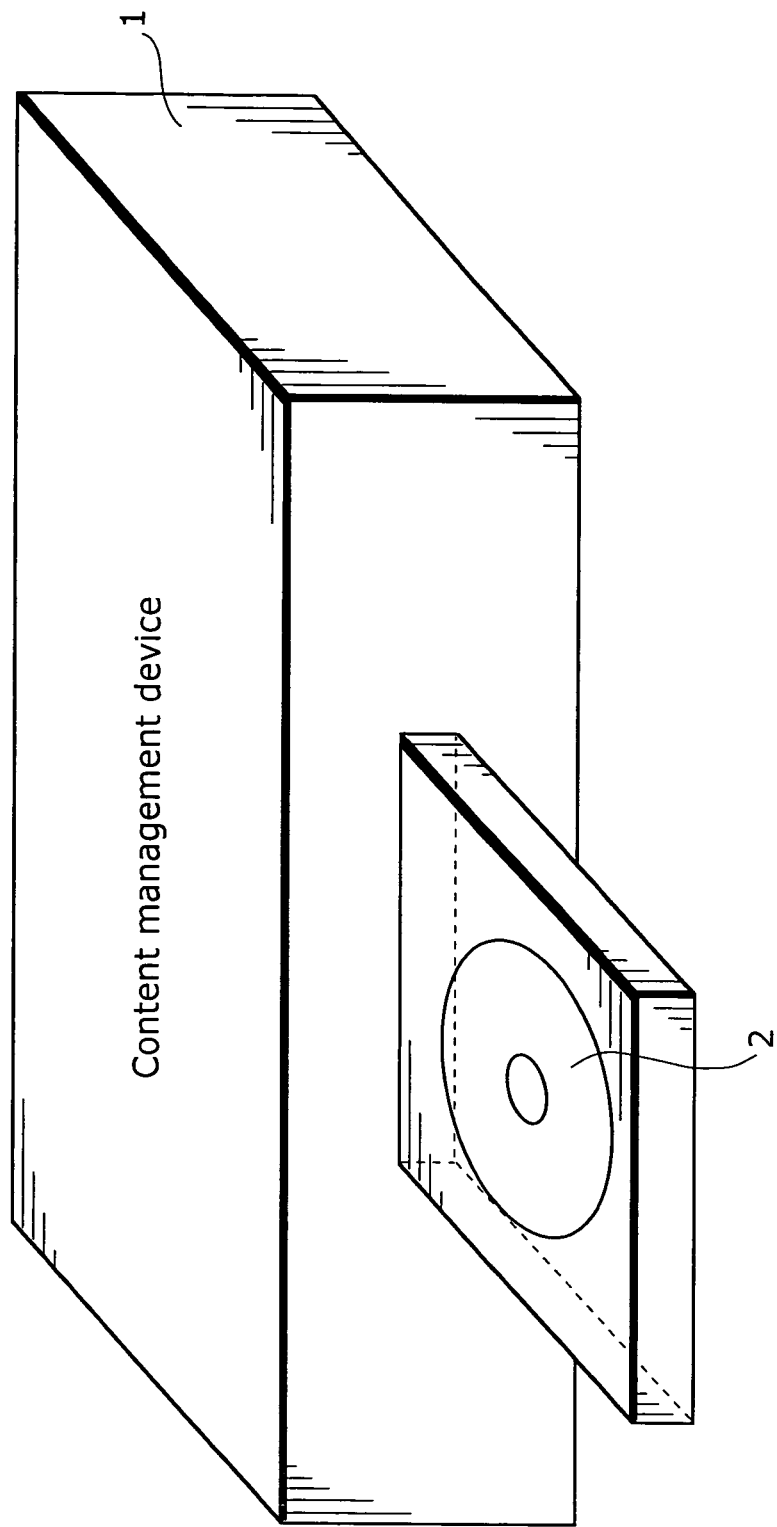
FIG. 1 is perspective views of a content management device 1 and a portable recording medium 2 in the first embodiment.

FIG. 1 is perspective views of the content management device 1 and the portable recording medium 2 in the first embodiment. The content management device 1 is an device for moving a content into a disc-shaped portable recording medium 2 and also for reproducing the content. When the content management device 1 moves a content into the portable recording medium 2, the device 1 does not delete the content but change the status of the content to the status of reproduction being inactivated, yet the content is still restorable later. The portable recording medium 2 is a medium for storing contents as one example of the second recording medium. The first recording medium in the first embodiment is hereinafter described as a content storage unit 13 and the unit 13 is mounted in the content management device 1.

Figure 2:
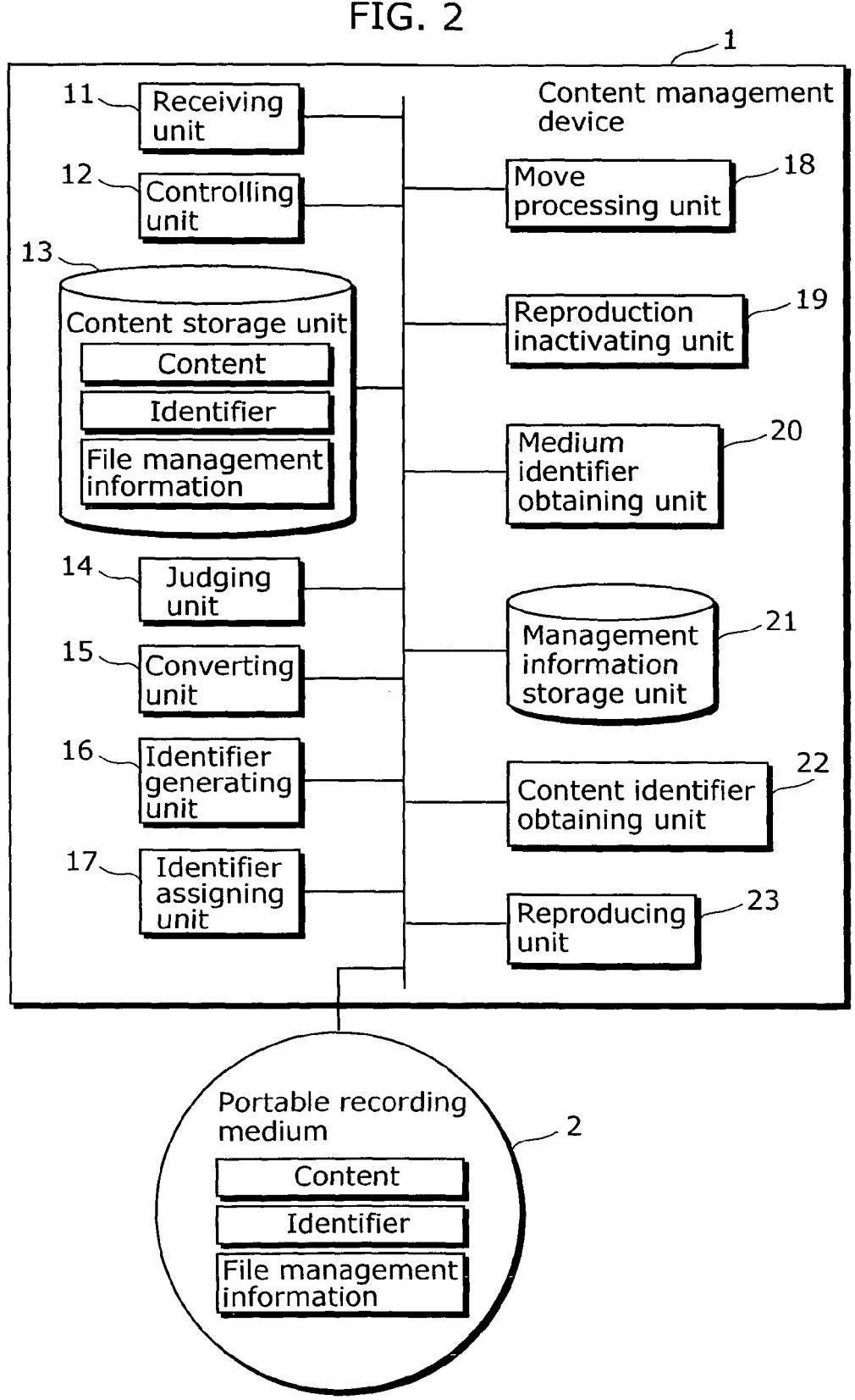
FIG. 2 is a block diagram illustrating a configuration of the content management device 1 and the portable recording medium 2 in the first embodiment.

FIG. 2 is a block diagram illustrating a configuration of the content management device 1 and the portable recording medium 2. As shown in FIG. 2, the content management device 1 includes a receiving unit 11, a controlling unit 12, the content storage unit 13, a judging unit 14, a converting unit 15, an identifier generating unit 16, an identifier assigning unit 17, a move processing unit 18, an reproduction inactivating unit 19, a medium identifier obtaining unit 20, a management information storage unit 21, a content identifier obtaining unit 22 and a reproducing unit 23. The functions for each unit configuring the content management device 1 will be described together with a description of the operation of the content management device 1 hereinafter.

The operation of the content management device 1 in the first embodiment will be described.

In the first embodiment, suppose that a digital signal such as terrestrial digital broadcasting signal is already received by the receiving unit 11, and is stored as the first content 111 in the content storage unit 13 by the controlling unit 12. And suppose that the aforesaid digital signal is restricted by copy-once and the stream is coded by MPEG 2 standard.

Figure 3:
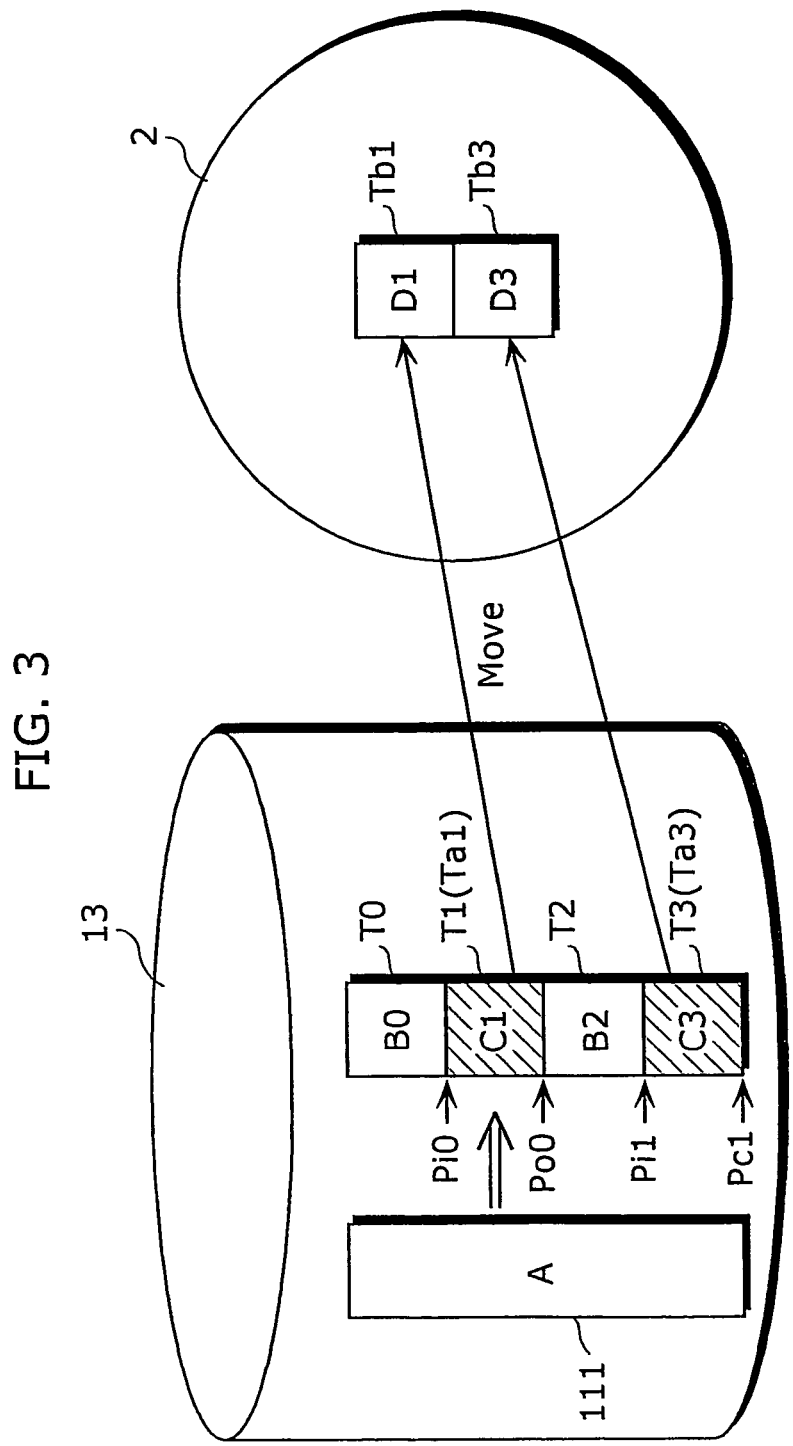
FIG. 3 is a diagram to describe moving a part of a content in the first embodiment.

In addition, in the first embodiment, suppose that the content management device 1 moves a part of the first content 111 to the portable recording medium 2. More specifically, as shown in FIG. 3, suppose that the first content 111 stored in the content storage unit 13 is divided into four contents from content T0 to content T3, and content T1 (or represented as "content Ta1") and content T3 (or represented as "content Ta3") are moved into the portable recording medium 2.

Furthermore, suppose the whole of the first content 111 is reproduced by the content management device 1 afterward.

(Moving a Part of a Content)

Figure 4:
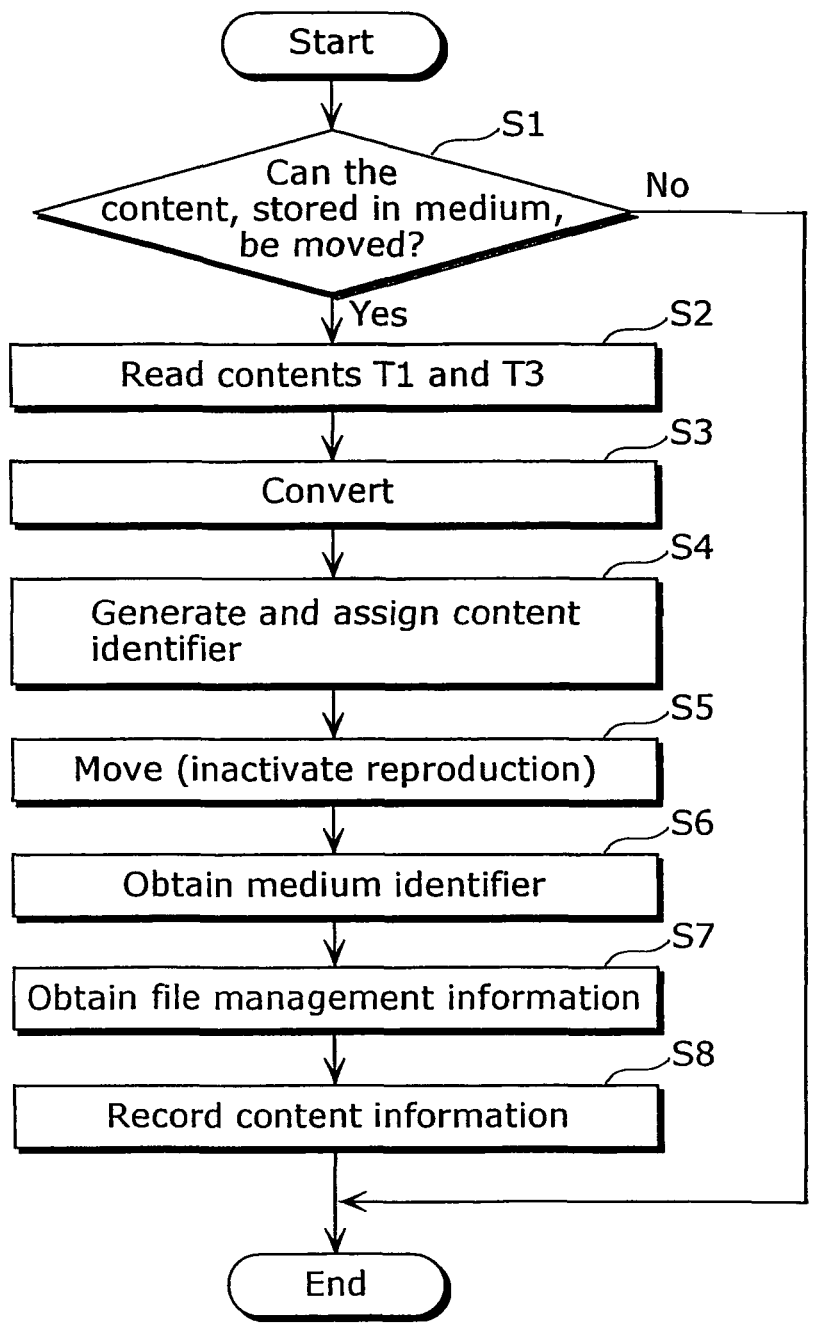
FIG. 4 is a first flowchart showing an operation of the content management device 1 in the first embodiment.

First, the case when content T1 and content T3, that are the parts of the first content 111, being moved into the portable recording medium 2 will be described using FIG. 4. FIG. 4 is a flowchart of each operation at the time of moving content T1 and content T3 into the portable recording medium 2.

Suppose that the positions of content T1 and content T3, to be moved partly, in the stream are as follows: the head position is pi0 and the end position is po0 for content T1, and the head position is pi1 and the end position is po1 for content T3.

The judging unit 14 reads medium information in the content storage unit 13 and medium information in the portable recording medium 2, and judges whether or not the content storage unit 13 and the portable recording medium 2 are the media in which the content, stored in the content storage unit 13, can be moved (S1). For example, the judging unit 14 judges whether or not the content storage unit 13 and the portable recording medium 2 are the media in which the recorded data can be rewritten. At the same time, the judging unit 14 judges whether or not the content storage unit 13 and the portable recording medium 2 are the media equipped with copyright protection. And then the judging unit 14 judges whether or not the content storage unit 13 and the portable recording medium 2 are the media in which the content can be moved based on the two judgments (S1). More particularly when the content storage unit 13 is a sort of write-once recording medium, the recorded data can not be deleted. Hence the judging unit 14 judges that the content storage unit 13 is a medium in which the content cannot be moved (No in S1). And when the portable recording medium 2 is a sort of rewritable medium like DVD+RW without copyright protection, the judging unit 14 judges that the portable recording medium 2 is a medium in which the content can not be moved (No in S1). When the judging unit 14 judges that the content storage unit 13 or the portable recording medium 2 is not the medium in which the content can be moved (No in S1), the content management device 1 notifies the judgment outward and terminates the operation.

On the other hand when the judging unit 14 judges that the content storage unit 13 and the portable recording medium 2 are the media in which the content can be moved (Yes in S1), the each unit of the content management device 1 performs followings.

The controlling unit 12 reads the stream from head position pi0 till end position po0 for content T1 and the stream from head position pi1 till end position po1 for content T3 sequentially (S2).

The converting unit 15 converts content T1 and content T3 into such as deteriorated quality of video/audio of encoded compressed content T1 and content T3. For example, the converting unit 15 decodes encoded compressed content T1 and content T3 into video/audio signals of the baseband, and encodes and compresses the decoded video/audio signals according to parameters so as to generate the converted stream (S3). As for the parameter for video, the information to specify such as a compressed mode, a video size, a bit rate and frame rate can be exemplified. And as for the parameter for audio, the information to specify such as a compressed mode, a bit rate, the number of samplings and the number of channels can be exemplified. More specifically in the case where the first content 111 including content T1 and content T3 is the stream of HDTV broadcasting signal, the portable recording medium 2 is a DVD-RAM, and the converting unit 15 converts the content of HDTV broadcasting signal into the content of SDTV broadcasting signal, the converting unit 15 performs followings. Particularly the converting unit 15 converts the video size from HD size (e.g. 1920×1080 interlace) into SD size (e.g. 720×480 interlace). And regarding the audio signal, the converting unit 15, for example, converts AAC mode into AC-3 mode which are used in broadcasting. And also the converting unit 15 converts the bit rate for content T1 and content T3 to the amount approximately not more than 10 Mbps including the audio signals. And the parameter may be determined beforehand or may be set by a user.

Hereinafter contents T1 and T3 before being converted by the converting unit 15 are represented by pre-converted content Ta1 and pre-converted content Ta3 respectively, and contents T1 and T3, converted by the converting unit 15, are represented by converted content Tb1 and converted content Tb3 as shown in FIG. 3.

As additional matter, the converting unit 15, as mentioned above, may convert in different compressing modes for the pre-converted content and the converted content. Concerning to the compressing modes, MPEG1, MPEG2, MPEG4, H.264, DV compressing and so on are included.

The identifier generating unit 16 generates identifier "B0" to be assigned to content T0, that is stored in the content storage unit 13 and not to be moved, and also generates identifier "B2" to be assigned to content T2, that is stored in the content storage unit 13, not to be moved (S4). And the identifier generating unit 16 generates identifier "C1" to be assigned to pre-converted content Ta1, and also generates identifier "C3" to be assigned to pre-converted content Ta3 (S4). Moreover the identifier generating unit 16 generates identifier "D1" to be assigned to converted content Tb1, and also generates identifier "D3" to be assigned to converted content Tb3 (S4).

The identifier generating unit 16 generates each identifier using information on a manufacturer manufactured the content management device 1, information on the content management device 1 (e.g. a serial number of the content management device 1) and information on the converted time/date of a content, a random number and so on.

The identifier assigning unit 17 deletes identifier A assigned to the first content 111 stored in the content storage unit 13, assigns identifier "B0" to content T0 not to be moved, and assigns identifier "B2" to content T2 not to be moved as shown in FIG. 3 (S4). And also the identifier assigning unit 17 assigns identifier "C1" to pre-converted content Ta1, and assigns identifier "C3" to pre-converted content Ta3 (S4). Moreover the identifier assigning unit 17 assigns identifier "D1" to converted content Tb1, and assigns identifier "D3" to converted content Tb3.

The move processing unit 18 records the stream converted by the converting unit 15, that are converted content Tb1 and converted content Tb3, in the portable recording medium 2 (S5). At this moment, the move processing unit 18 records identifier "D1" of converted content Tb1 and identifier "D3" of converted content Tb3 in the portable recording medium 2 by putting the identifiers in the aforesaid stream (S5). For example, the move processing unit 18 records identifier "D1" of converted content Tb1 and identifier "D3" of converted content Tb3 in the user area within the stream. As additional matter, the move processing unit 18 performs recording after scramble processing based on a copyright protection such as CPRM, when the move processing unit 18 records converted content Tb1 and converted content Tb3 in the portable recording medium 2. At that time, the move processing unit 18 records identifier "D1" and identifier "D3" as well in a user area within the stream after scramble processing.

When the move processing unit 18 records converted content Tb1 and converted content Tb3 in the portable recording medium 2, the reproduction inactivating unit 19 places pre-converted content Ta1 and pre-converted content Ta3 stored in the content storage unit 13 in a status of reproduction being inactivated, subject to be able to activate the contents later (S5). For example, the reproduction inactivating unit 19 converts pre-converted content Ta1 and pre-converted content Ta3 into invalid data by encrypting, and then pre-converted content Ta1 and pre-converted content Ta3 are inactivated. Or the reproduction inactivating unit 19 assigns pointers to both head position pi0 and end position po0 for pre-converted content Ta1 and head position pi1 and end position po1 for pre-converted content Ta3. And the reproduction inactivating unit 19 inactivates pre-converted content Ta1 and pre-converted content Ta3 subject not to be reproduced, by skipping compulsory from head position pi0 to end position po0 for pre-converted content Ta1 and also by skipping compulsory from head position pi1 to end position po0 for pre-converted content Ta3, when the first content 111 including pre-converted content Ta1 and pre-converted content Ta3 stored in the content storage unit 13 are reproduced.

The medium identifier obtaining unit 20 obtains an identifier of the recording medium (S6). More specifically the medium identifier obtaining unit 20 obtains medium identifier α, the identifier of the content storage unit 13, out of the storage unit 13, and obtains medium identifier β, the identifier of the portable recording medium 2, out of the portable recording medium 2 (S6).

The controlling unit 12 obtains file management information FA including information to specify the stored location for content T0, pre-converted content Ta1, content T2 and pre-converted content Ta3 in the content storage unit 13 (S7).

The controlling unit 12 records medium identifiers, that is the identifier related to the content storage unit 13, in the management information storage unit 21 by associating with identifier "B0" of content T0, identifier "B2" of content T2, identifier "C1" of pre-converted content Ta1 and identifier "C3" of pre-converted content Ta3 as shown in FIG. 5 (S8). At that time, the controlling unit 12 records head position pi0 and end position po0 for pre-converted content Ta1 and head position pi1 and end position po0 for pre-converted content Ta3 on the original stream in the management information storage unit 21 by associating with medium identifier α and so on (S8). And also the controlling unit 12 records the file management information FA in the management information storage unit 21 by associating with medium identifier α and so on (S8). Furthermore the controlling unit 12 deletes the file management information FA in the content storage unit 13.

Additionally the controlling unit 12 records medium identifier β, that is the identifier related to the portable recording medium 2, in the management information storage unit 21 by associating with the identifier "D1" of converted content Tb1 and identifier "D3" of converted content Tb3 (S8). Hereinafter, the information to be stored in the management information storage unit 21 is simply called "content information".

(Moving to the Counter Direction and Reproducing)

Figure 6:
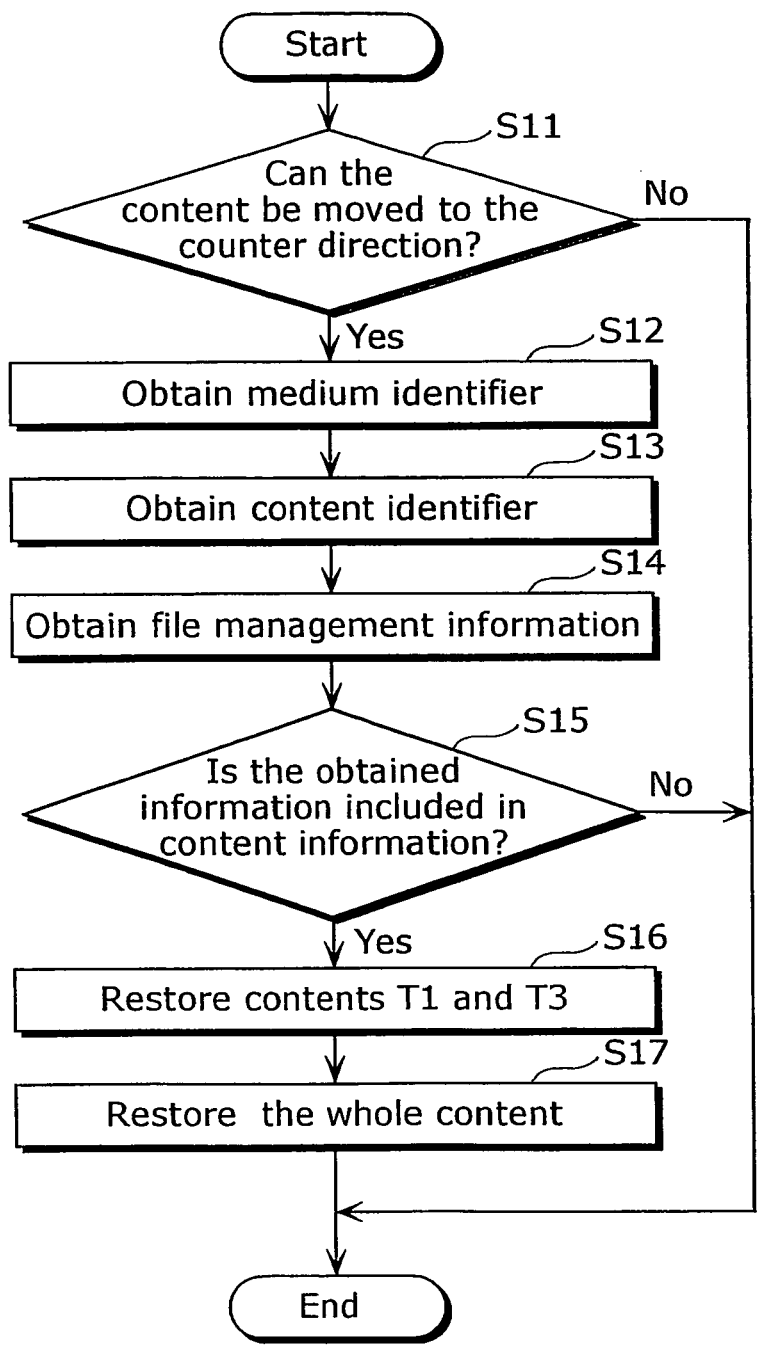
FIG. 6 is a second flowchart showing an operation of the content management device 1 in the first embodiment.

It will be described about the case when the first content 111 being activated (moving to the counter direction) and reproduced after converted content Tb1 and converted content Tb3, which are the part of the first content 111, are moved to the portable recording medium 2 using FIG. 6. FIG. 6 is a flowchart for an operation of the case, when the first content 111 is activated and reproduced after converted content Tb1 and converted content Tb3 are moved.

The judging unit 14 judges whether or not the content storage unit 13 and the portable recording medium 2 are the media in which converted content Tb1 and converted content Tb3 can be moved to the counter direction after moved to the portable recording medium 2 (S11). For example, the judging unit 14 judges whether or not the content storage unit 13 and the portable recording medium 2 are the media in which the recorded data can be rewritten, like the case as converted content Tb1 and converted content Tb3 are moved to the portable recording medium 2. At the same time, the judging unit 14 judges whether or not the content storage unit 13 and the portable recording medium 2 are the media equipped with copyright protection. And the judging unit judges whether or not the content storage unit 13 and the portable recording medium 2 are the media in which the contents can be moved to the counter direction (S11). When the judging unit 14 judges that the content storage unit 13 or the portable recording medium 2 are not the media in which the contents can be moved to the counter direction (No in S11), the content management device 1 notifies the judgment outward, and terminates the operation.

On the other hand, when the judging unit 14 judges that the content storage unit 13 and the portable recording medium 2 are the media in which the contents can be moved to the counter direction (Yes in S11), the each unit of content management device 1 performs followings.

The medium identifier obtaining unit 20 obtains an identifier of the recording medium (S12). More specifically, the medium identifier obtaining unit 20 obtains medium identifier α, that is the identifier of the content storage unit 13 and also obtains medium identifier β, that is the identifier of the portable recording medium 2 (S12).

The content identifier obtaining unit 22 obtains identifier "B0" of content T0, identifier "B2" of content T2, and identifier "C1" of pre-converted content Ta1 and identifier "C3" of pre-converted content Ta3 from the content storage unit 13 (S13). Furthermore the content identifier obtaining unit 22 obtains identifier "D1" of converted content Tb1 and identifier "D3" of converted content Tb3 from the portable recording medium 2 (S13). Besides pre-converted content Ta1 and pre-converted content Ta3, in a status of reproduction being inactivated, are stored in the content storage unit 13.

The controlling unit 12 obtains a file management information FA from the content storage unit 13 (S14).

The judging unit 14 judges whether or not the all identifiers, that being obtained by the medium identifier obtaining unit 20 and the content identifier obtaining unit 22, are included in the content information stored in the management information storage unit 21, in order to judge whether or not converted content Tb1 and converted content Tb3 can be moved to the counter direction (S15). Besides, the judging unit 14 does not utilize head position pi0 and end position po0 for pre-converted content Ta1 and head position pi1 and end position po1 for pre-converted content Ta3 in order to judge whether or not the content can be moved to the counter direction.

When the judging unit 14 judges that all identifiers obtained by the medium identifier obtaining unit 20 and the content identifier obtaining unit 22 are not included in the content information (No in S15), the content management device 1 notifies the judgment outward, and terminates the operation.

On the other hand, when the judging unit 14 judges that all identifiers obtained by the medium identifier obtaining unit 20 and the content identifier obtaining unit 22 are included in the content information stored in the management information storage unit 21 (Yes in S15), the controlling unit 12 records the file management information FA in the content storage unit 13 again. The reproduction inactivating unit 19 activates pre-converted content Ta1 and pre-converted content Ta3, which are a part of the first content 111, stored in the content storage unit 13 in a status of reproduction being inactivated, using the file management information FA recorded again (S16). For example, the reproduction inactivating unit 19 deletes the pointer stored in the content storage unit 13 or decrypts the encryption to restore pre-converted content Ta1 and pre-converted content Ta3, and then the status of reproduction for the contents can be activated. At the same time the reproduction inactivating unit 19 deletes converted content Tb1 and converted content Tb3, which are stored in the portable recording medium 2.

The reproducing unit 23 reproduces the first content 111 by executing the reproduction of content T0, pre-converted content Ta1, content T2 and pre-converted content Ta3, which are stored in the content storage unit 13, in the sequence of content T0, pre-converted content Ta1, content T2 and pre-converted content Ta3 (S16).

As additional matter, in the embodiment mentioned above, since the converting unit 15 converts pre-converted content Ta1 and pre-converted content Ta3 into such as deteriorated quality in video/audio, the reproduction inactivating unit 19 activates pre-converted content Ta1 and pre-converted content Ta3, which are a part of the first content 111, stored in a status of reproduction being inactivated in the content storage unit 13. However the converting unit 15 does not need to convert. In that case when the judging unit 14 judges that all information obtained by the medium identifier obtaining unit 20 and the content identifier obtaining unit 22 are included in the content information stored in the management information storage unit 21, the move processing unit 18 obtains converted content Tb1 (the content is actually not converted) and converted content Tb3 (the content is actually not converted) from the portable recording medium 2. And then the reproducing unit 23 may reproduce the first content 111 by operating the reproduction of content T0 and content T2 stored in the content storage unit 13 and converted content Tb1 and converted content Tb3 obtained by the move processing unit 18 by reproducing in the sequence of content T0, converted content Tb1, content T2 and converted content Tb3.

This method is effective in the following case. When the move processing unit 18 records converted content Tb1 and converted content Tb3 in the portable recording medium 2, the reproduction inactivating unit 19 does not place pre-converted content Ta1 and pre-converted content Ta3 stored in the content storage unit 13 in a status of reproduction being inactivated subject to be able to activate the contents later, but the reproduction inactivating unit 19 deletes the contents and subsequently reproduces the first content 111.

The reproduction inactivating unit 19 may delete the pre-converted content Ta1 and pre-converted content Ta3 stored in the content storage unit 13, not placing the contents in a status of reproduction being inactivated. When the contents are deleted, the reproduction inactivating unit 19, for example, may delete pre-converted content Ta1 and pre-converted content Ta3 by deleting the corresponding part to pre-converted content Ta1 and pre-converted content Ta3 in the file management information in the first content 111.

The content information stored in the management information storage unit 21 may include information indicating which is the original content, pre-converted content Ta1 and pre-converted content Ta3 stored in the content storage unit 13 or converted content Tb1 and converted content Tb3 in the portable recording medium 2.

Besides, in the first embodiment mentioned above, although the content storage unit 13 is exemplified as the first recording medium, the first recording medium is not required to be mounted in the content management device 1, but the first recording medium may be an external recording medium of the content management device 1 like the portable recording medium 2. When the first recording medium is DVD-R, as DVD-R is a write-once recording medium, the judging unit 14 judges that the first recording medium is not a medium in which the content can be moved.

When the reproducing unit 23 reproduces the first content 111, the reproduction inactivating unit 19 may not delete converted content Tb1 and converted content Tb3 stored in the portable recording medium 2, but may place the contents in a status of reproduction being inactivated. For example, the reproduction inactivating unit 19 moves the file management information for converted content Tb1 and converted content Tb3 to the area where a user is unable to access. Alternatively, the reproduction inactivating unit 19 encrypts converted content Tb1 and converted content Tb3, accordingly the reproduction inactivating unit 19 may place converted content Tb1 and converted content Tb3 stored in the portable recording medium 2 in a status of reproduction being inactivated.

Additionally when the reproducing unit 23 reproduces the first content 111, the controlling unit 12 may delete the content information to be stored in the management information storage unit 21.

And also the converting unit 15 may newly convert into the part of the content by activating the content being inactivated for reproduction based on the instruction from outside such as user's instruction. Accordingly even if the user fails to encode content, the user is able to encode again.

Besides, although the move processing unit 18 is exemplified as an output unit, in the case where the portable recording medium 2 itself is a data recordable medium, the move processing unit 18 may be replaced as the output unit of the content.

The Second Embodiment

A content management device 100 in the second embodiment will be described using FIG. 7.

Figure 7:
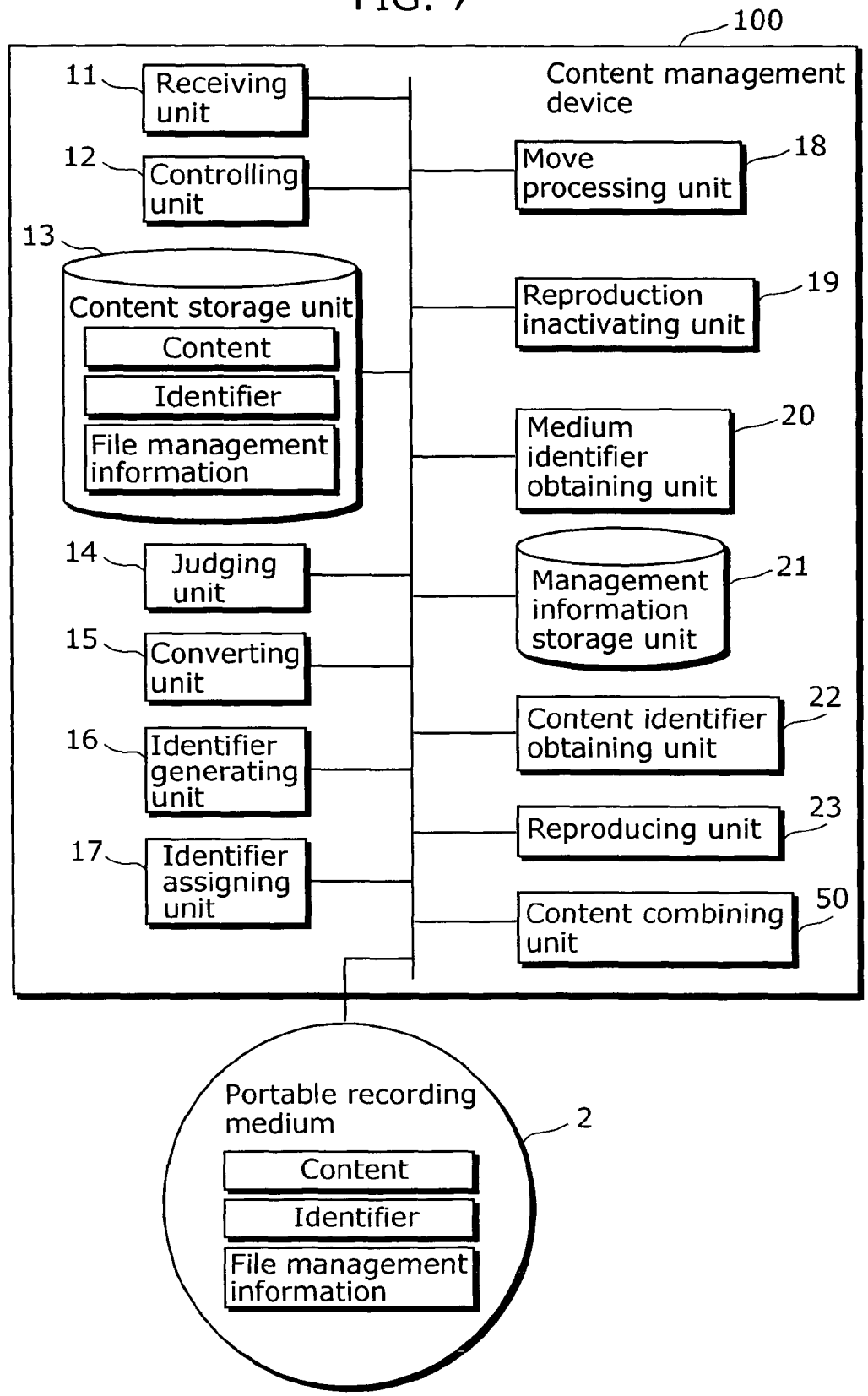
FIG. 7 is a block diagram illustrating a configuration of a content management device 100 and the portable recording medium 2 in the second embodiment.

FIG. 7 is a block diagram illustrating a configuration for the content management device 100 in the second embodiment. The difference between the content management device 1 in the first embodiment and the content management device 100 in the second embodiment is, for example, that the content management device 100 includes a content combining unit 50, which is not included in the content management device 1. So only the different points from the content management device 1 for the content management device 100 will be described hereinafter.

(Moving a Part of a Content)

Figure 8:
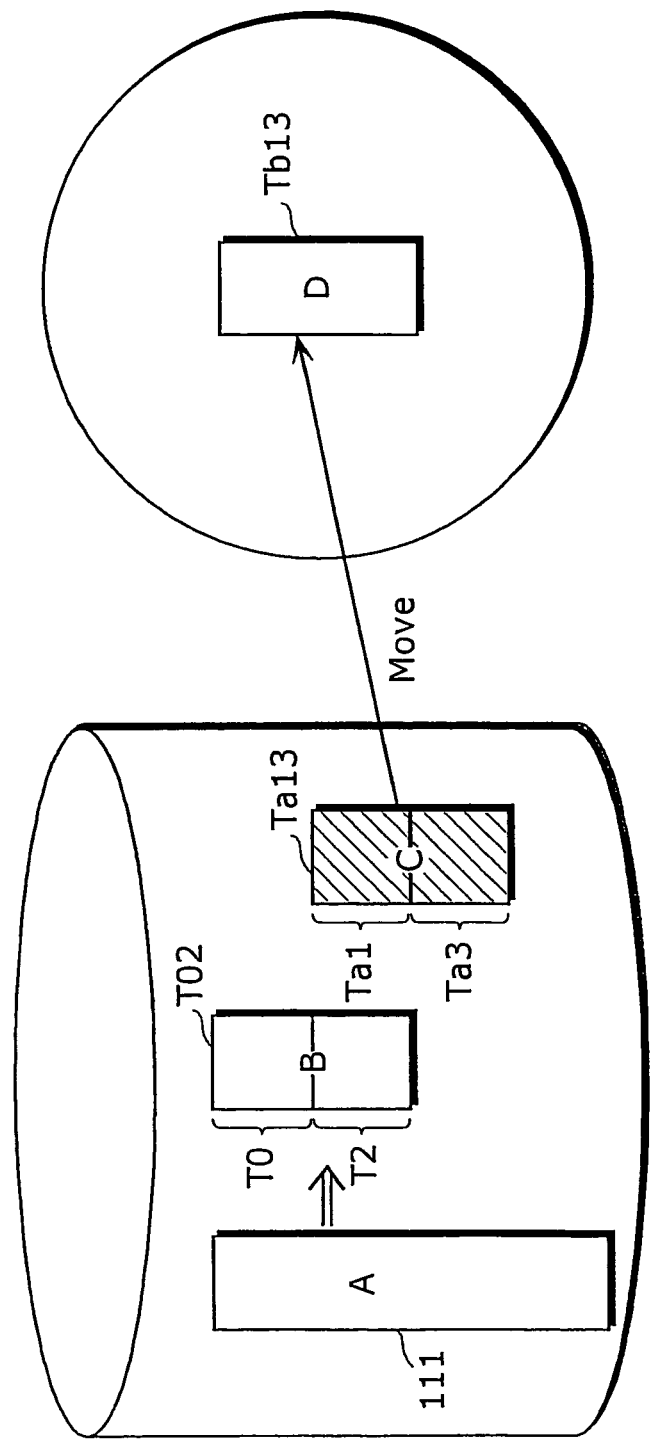
FIG. 8 is a diagram to describe moving a part of a content in the second embodiment.

The content combining unit 50 generates stream T02 by combining content T0 and content T2 stored in the content storage unit 13, when the move processing unit 18 records converted content Tb1 and converted content Tb3 into the portable recording medium 2 as shown in FIG. 8. And also the content combining unit 50 generates pre-converted stream Ta13 by combining pre-converted content Ta1 and pre-converted content Ta3. And the content combining unit 50 records combined stream T02 and pre-converted stream Ta13 into the content storage unit 13. At that time, the content combining unit 50 deletes the first content 111 that is the original stream.

The identifier generating unit 16 generates identifier "B" to be assigned to stream T02 not to be moved, and generates identifier "C" to be assigned to pre-converted stream Ta13 to be moved. When pre-converted stream Ta13 is recorded in the portable recording medium 2, the stream is recorded as converted stream Tb13. And then the identifier generating unit 16 generates identifier "D" assigned to converted stream Tb13 after being moved. The identifier assigning unit 17 assigns identifier "B" to stream T02, identifier "C" to pre-converted stream Ta13 and identifier "D" to converted stream Tb13.

The move processing unit 18 records converted stream Tb13 in the portable recording medium 2. At this time, the move processing unit 18 records identifier "D" for converted stream Tb13 by putting in converted stream Tb13 in the portable recording medium 2. The move processing unit 18, for example, records identifier "D" for converted stream Tb13 in the user area in converted stream Tb13.

The reproduction inactivating unit 19 inactivates the reproduction of the generated pre-converted stream Ta13. The generated pre-converted stream Ta13 is a stream combined pre-converted content Ta1 and pre-converted content Ta3.

The controlling unit 12 records medium identifier α, which is the identifier related to the content storage unit 13, by associating with identifier "B" of stream T02 and identifier "C" of pre-converted stream Ta13, into the management information storage unit 21. At that time, the controlling unit 12 records head position pi0 and end position po0 for pre-converted content Ta1 and head position pi1 and end position po1 for pre-converted content Ta3, by associating with the medium identifier α and so on, into the management information storage unit 21. And then the controlling unit 12 records the file management information for stream T02 and pre-converted stream Ta13 on the content storage unit 13, by associating with medium identifier α and so on, into the management information storage unit 21.

Additionally the controlling unit 12 records medium identifier β, which is the identifier related to the portable recording medium 2, by associating with identifier "D" of converted stream Tb13, into the management information storage unit 21.

The information stored in the management information storage unit 21 is "content information".

(Moving to the Counter Direction and Reproducing)

The medium identifier obtaining unit 20 obtains an identifier of a recording medium. In fact the medium identifier obtaining unit 20 obtains medium identifier α, which is the identifier of the content storage unit 13, and also obtains medium identifier β, which is the identifier of the portable recording medium 2.

The content identifier obtaining unit 22 obtains identifier "B" of stream T02 and identifier "C" of pre-converted stream Ta13 from the content storage unit 13. And also the content identifier obtaining unit 22 obtains identifier "D" of converted stream Tb13 from the portable recording medium 2.

The judging unit 14 judges whether or not all of the identifiers obtained by the medium identifier obtaining unit 20 and the content identifier obtaining unit 22 are included in the content information stored in the management information storage unit 21 so as to judge whether or not converted stream Tb13 can be moved to the counter direction.

When the judging unit 14 judges that all of the identifiers obtained by the medium identifier obtaining unit 20 and the content identifier obtaining unit 22 are included in the content information, the reproduction inactivating unit 19 activates pre-converted stream Ta13, which is a part of the first content 111, stored in the content storage unit 13 in a status of reproduction being inactivated.

And the reproducing unit 23 reproduces the first content 111 by reproducing and combining contents in the sequence of content T0, pre-converted content Ta1, content T2 and pre-converted content Ta3 based on the pointer on the original stream.

The Third Embodiment

A content management device 101 in the third embodiment will be described using FIG. 9.

FIG. 9 is a block diagram illustrating a configuration for the content management device 101 in the third embodiment. The difference between the content management device 1 in the first embodiment and the content management device 101 in the third embodiment is that the content management device 101 includes an encryption processing unit 51, which is not included in the content management device 1. So only the different points from the content management device 1 for the content management device 101 will be described hereinafter.

In the first embodiment, when the move processing unit 18 records converted content Tb1 and converted content Tb3 in the portable recording medium 2, the controlling unit 12 records the content information in the management information storage unit 21.

On the other hand, in the third embodiment, when the move processing unit 18 records converted content Tb1 and converted content Tb3 in the portable recording medium 2, the encryption processing unit 51 encrypts the content information, and the controlling unit 12 records the content information encrypted by the encryption processing unit 51 in the management information storage unit 21. At the time of counter-move processing, the encryption processing unit 51 decrypts the encrypted content information and renders the decrypted content information to the judging unit 14.

The encryption processing unit 51 may encrypt a part of the content information, for example only the part for the file management information.

In the embodiment mentioned above, it is described about the case that the content management device 1 moves a part of the first content 111 to the portable recording medium 2. The content management device 1 is also able to move the whole of the first content 111 to the portable recording medium 2. In that case, as shown in FIG. 10, the content management device 1 assigns identifier "A" to the first content 111 and identifier "X" to the content to be recorded in the portable recording medium 2. At the time of counter-move and reproduction processing, the content management device 1 reproduces the first content 111 or the content to be recorded in the portable recording medium 2, like the case of reproducing pre-converted content Ta1 or the corresponding converted content Tb1 in FIG. 3.

Besides, the content management device 1, as shown in FIG. 11, after the part of the first content 111 is moved to the portable recording medium 2, the part of the content moved to the portable recording medium 2 can be further moved to the portable recording medium 200. The content management device 1 reproduces the whole of contents when not only the identifiers of the two recording media but also the identifiers of the two contents are included in the content information stored in the management information storage unit 21. Accordingly the content management device 1 manages not only the identifiers of the recording media but also the identifiers of the contents.

In the case where only identifiers of the recording media are managed, (1) if contents Ta1 and Ta3 assigned identifiers "C1" and "C3" occupy the most part of the first content 111, and also (2) if content Tc2, assigned identifier "F" that is a part of contents Tb1 and Tb3 corresponding to contents Ta1 and Ta3, occupies the most part of contents Tb1 and Tb3, the following problem occurs. That is to say, if content Tc1, assigned identifier "E" that is the remaining contents Tb1 and Tb3 recorded in the portable recording medium 2, is deleted, content Td, assigned identifier "G" corresponding to content Tc2 assigned identifier "F" that occupies the most part of the first content 111, can be duplicated to the portable recording medium 200. In other words, content Td, assigned identifier "G" that occupies the most part of the first content 111, can be duplicated to the portable recording medium 200. However, as mentioned above, the content management device 1 manages not only identifiers of recording media but also identifiers of contents. As a result, the problem about duplication for content Td assigned identifier "G", that occupies the most part of the first content 111, does not happen.

INDUSTRIAL APPLICABILITY

The content management device in the present invention is practicable as an device for receiving a digital video/audio data with copyright protection such as digital television broadcasting signal, recording in the first recording medium such as HDD, inactivating the reproduction and outputting the data to the second recording medium and subsequently reproducing the data.

What is claimed is:

1. A content management device comprising:
   a converting unit configured to read partial data that is part of content recorded in a first recording medium, and to convert the read partial data in order to generate transfer content;
   outputting circuitry configured to move the transfer content generated by the converting unit to a second recording medium, wherein the content recorded in the first recording medium remains in its entirety within the first recording medium;
   a reproduction controller configured to disable reproduction of the partial data of the content read by the converting unit and enable reproduction of remaining data of the content recorded in the first recording medium by assigning a pointer to the partial data for skipping the partial data, when the transfer content moved to the second recording medium is determined to be reproducible by an external device, and to enable reproduction of all of the content recorded in the first recording medium, including the partial data and the remaining data, by removing the pointer assigned to the partial data, when the transfer content moved to the second recording medium is determined not to be reproducible by the external device; and a reproducing circuitry configured to reproduce data for which reproduction is enabled by the reproduction controller.

2. The content management device according to claim 1, wherein said converting unit is configured to transcode the read partial data to generate the transfer content of a quality lower than a quality of the read partial data.

3. The content management device according to claim 1, wherein said converting unit is configured to transcode the read partial data to generate the transfer content that differs from the read partial data in at least one of a compression scheme, a video size, a bit rate, a frame rate, the number of samplings, and the number of channels.

4. The content management device according to claim 1, wherein said converting unit is configured to transcode the read partial data to generate transfer content having a video size smaller than a video size of the read partial data.

5. The content management device according to claim 1, wherein said converting unit is configured to transcode the read partial data by decoding the read partial data and encoding the decoded partial data according to a predetermined parameter.

6. The content management device according to claim 1, wherein said reproduction controller is configured to make the partial data irreproducible and the remaining data reproducible by encrypting the partial data.

7. A content management method for managing reproduction of content, the method comprising steps of:

reading partial data that is part of content recorded in a first recording medium;

converting the read partial data in order to generate transfer content;

moving the generated transfer content to a second recording medium, wherein the content recorded in the first recording medium remains in its entirety within the first recording medium;

disabling reproduction of the partial data of the content recorded in the first recording medium and enabling reproduction of remaining data of the content recorded in the first recording medium by assigning a pointer to the partial data for skipping the partial data, when the generated transfer content moved to the second recording medium is determined to be reproducible by an external device;

enabling reproduction of all of the content recorded in the first recording medium, including the partial data and the remaining data, by removing the pointer assigned to the partial data, when the transfer content moved to the second recording medium is determined not to be reproducible by the external device; and reproducing data for which reproduction is enabled.

* * * * *